Dec. 17, 1968  F. J. KENT ETAL  3,416,349

EXTRUSION APPARATUS AND METHOD

Filed June 29, 1966  3 Sheets-Sheet 1

INVENTORS.
FRANCIS J. KENT
OTTO HAMMON

BY Seidel & Gonda

ATTORNEYS.

INVENTORS.
FRANCIS J. KENT
OTTO HAMMON
BY Seidel & Gonda

ATTORNEYS.

_United States Patent Office_

3,416,349
Patented Dec. 17, 1968

3,416,349
EXTRUSION APPARATUS AND METHOD
Francis J. Kent, Wallingford, Pa., and Otto Hammon, Cherry Hill, N.J., assignors to Baldwin-Lima-Hamilton Corporation, Philadelphia, Pa., a corporation of Delaware
Filed June 29, 1966, Ser. No. 561,461
10 Claims. (Cl. 72—270)

ABSTRACT OF THE DISCLOSURE

Extrusion apparatus and method are disclosed wherein a container is mounted for movement between an extrusion position and a loading position. In its loading position, the container is telescoped over the stem. A discrete supporting means is provided for supporting the billet between its ends while the container is moving from its loading position to its extrusion position. The supporting means is at least in part mounted for movement parallel to the stem and may be, at least in part, supported by the container itself.

---

This invention relates to apparatus for extruding metal objects such as billets and a method of extruding such billets.

In an extrusion press a metal object such as a heated billet having a length up to about five feet is charged into a container and then extruded through a die aligned with the container. Conventionally, the billet for a direct extrusion press is charged into the container from a position between the stem and the container. Thereafter, the stem enters the container and pushes the billet through the die. Thus, the stem has a stroke which is greater than the length of the container plus the longest billet which can be handled by the container.

In accordance with the present invention, the extrusion press has a stroke which is only about one-half that of the stem of prior art extrusion presses capable of handling billets of the same size and length. Thus, an extrusion press in accordance with the present invention is about forty percent shorter than comparable presses. This materially reduces the cost of the press and the floor space requirements of the press. Other benefits such as the need for substantially less hydraulic liquid are also attained by means of the present invention.

In the extrusion press of the present invention, a container is movable toward and away from a die. A loading means is movable to a position for supporting the billet between the die and the container so that the billet will be aligned with the die and the container. The container is mounted for movement toward the die and the billet enters the container as the container moves toward the die. As the container moves toward the die, it is moving from a position wherein it is telescoped over the stem. Thus, the stem is being withdrawn from the container while the billet is entering the container. When the billet is disposed within the container and the latter is juxtaposed to the die, then stem moves toward the die and extrudes the billet through the die.

The method of extruding the billet through a die in accordance with the present invention includes the step of positioning a billet between and aligned with a die and a container by a first means, transferring support of the billet to a second means, moving the container toward the die and simultaneously causing the billet to enter the container while the billet is at least partially supported by the second means, and extruding the billet through the die.

It is an object of the present invention to provide an extrusion apparatus which is substantially shorter than prior art devices capable of handling billets of the same size and length, even though support arms are used to support a billet positioned by a rocker arm unit.

It is an object of the present invention to provide a novel apparatus and method for extruding billets of the breech loading type, that is, wherein the billet is rapidly loaded into the container from a position between the container and the die while the container is moving toward the die.

It is another object of the present invention to provide novel extrusion apparatus and method which is simple, reliable, and which includes a stem having a substantially shorter stroke than prior art devices, while being capable of extruding billets of the same length, much faster due to a novel billet support.

It is another object of the present invention to provide an extrusion container and/or die supporting an arm which at least partially supports a billet to be extruded.

Other objects will appear hereinafter.

For the purpose of illustrating the invention, there are shown in the drawings forms which are presently preferred; it being understood, however, that this invention is not limited to the precise arrangements and instrumentalities shown.

Figure 1:
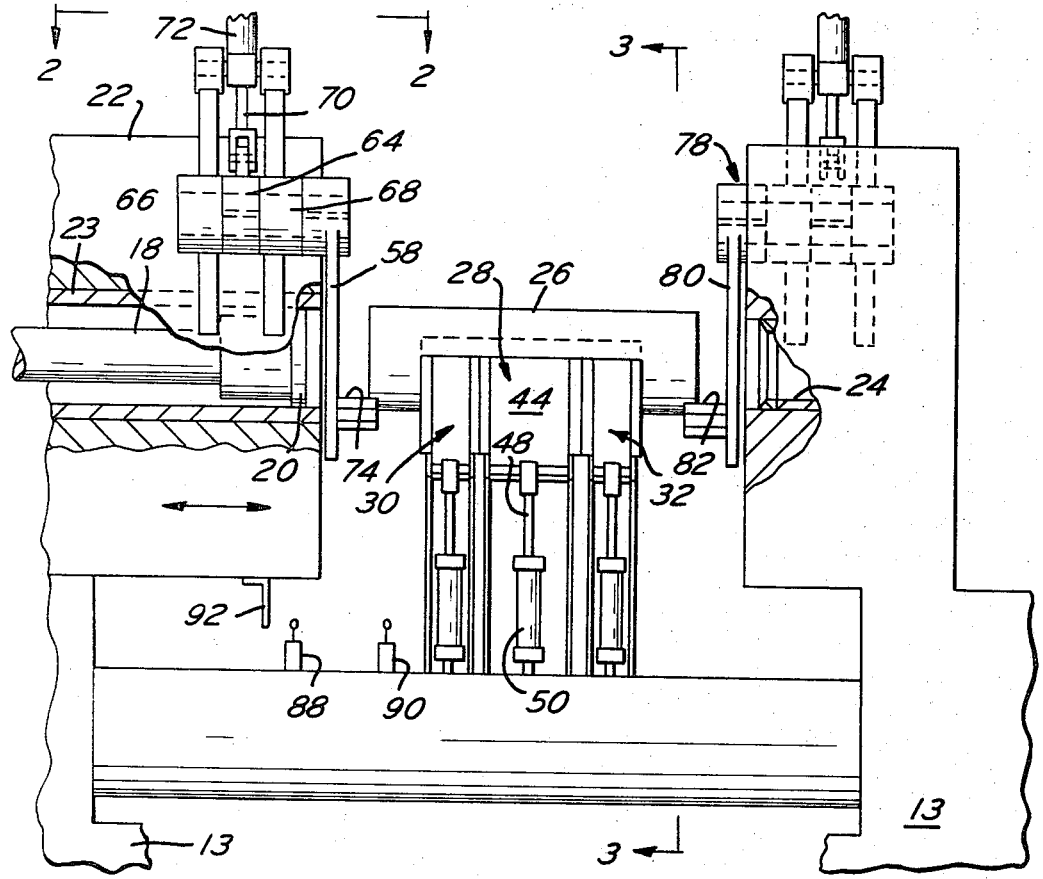
FIGURE 1 is a partial side elevation view, partly in section, of the extrusion press of the present invention.
Figure 3:
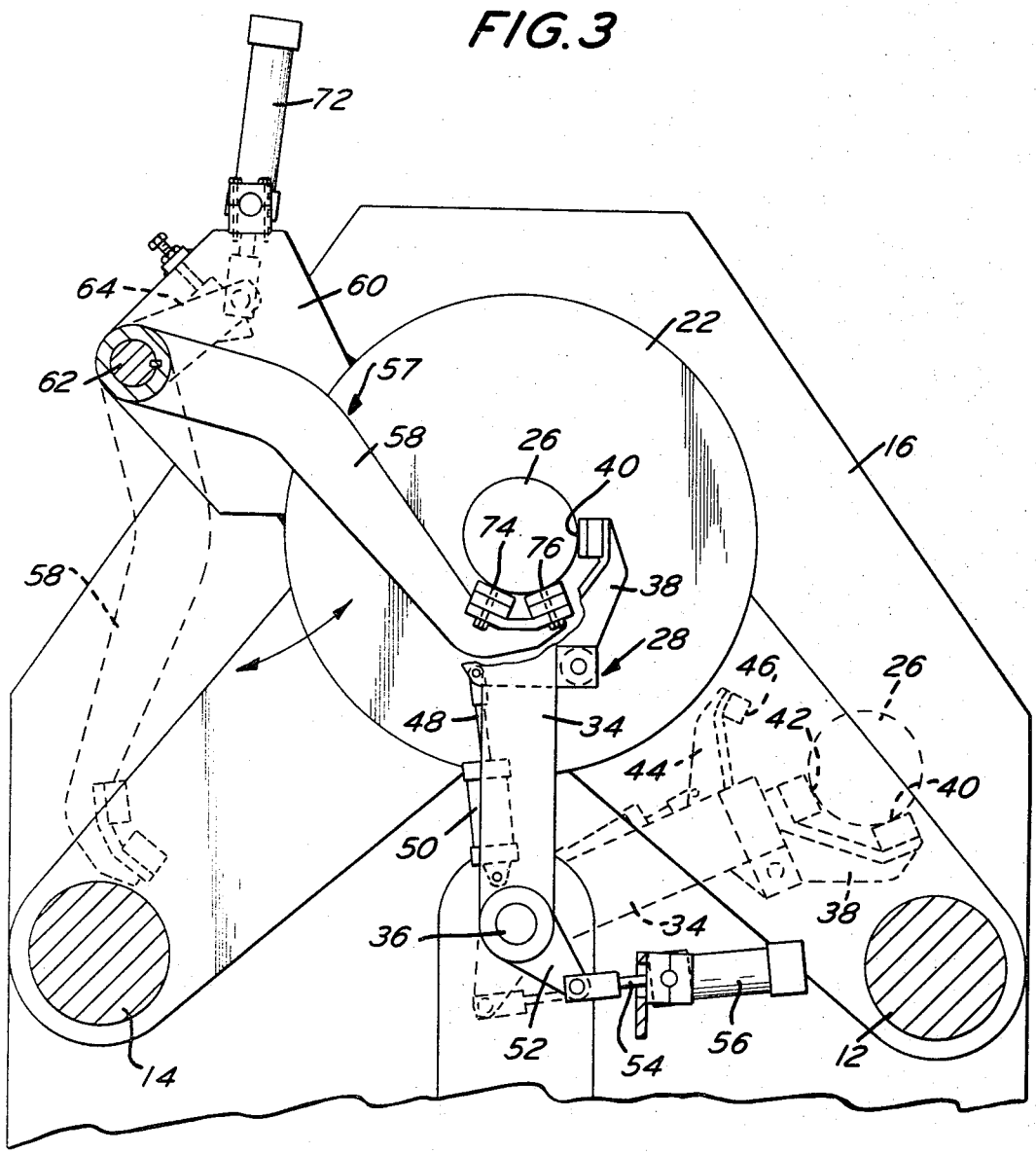
FIGURE 3 is a transverse sectional view taken along the line 3—3 in FIGURE 1.

Referring to the drawing in detail, wherein like numerals indicate like elements, there is shown in FIGURE 1 an extrusion press designated generally as 10. The extrusion press 10 includes a frame 13 having end portions of the press interconnected by a plurality of tie rods 12 and 14. A cross head 16, see FIGURE 3, is mounted for movement along the tie rods in a conventional manner. A pressing stem 18 is supported by the cross head 16 and mounted for movement toward and away from a die 24 by means of a piston and cylinder arrangement which per se is conventional in the art.

A container 22 is provided with a liner 23. The container 22 is mounted for movement toward and away from the die 24. The die 24 is stationary and supported by the frame 13. A dummy block 20 may be utilized between the end face of the stem 18 and a billet 26 to be extruded. The purpose and function of the dummy block 20 is well known to those skilled in the art.

A device for feeding dummy blocks and billets to the press 10, such as that disclosed in Patent 2,985,320 may be provided. The billets are received and moved to a loading position by one or more of the rocker arm units 28, 30 and 32. Each of these units are identical except that in the illustrated embodiment unit 28 is wider than units 30 and 32. Hence, only unit 32 will be described in detail.

Rocker arm unit 28 includes an arm 34 movable from a receiving position shown in phantom in FIGURE 3 to a loading position shown in solid line in FIGURE 3. Arm 34 is pivotably mounted for rotation about the longitudinal axis of pin 36. Remote from pin 36, arm 34 terminates in a jaw 38 having a pair of billet engaging surfaces 40 and 42. Surfaces 40 and 42 are on removable pads. The pads may be changed as desired so as to accommodate different sizes of billets.

Arm 34 is also provided with a movable jaw 44. Jaw 44 has a surface 46 adapted to engage the billet 26 in one position and is movable to the phantom position shown in FIGURE 3. Such movement of the jaw 44 is effected by a piston rod 48 and a cylinder 50. One end of rod 48 is pivotably connected to the jaw 44. The other end of the rod 48 is connected to a piston within cylinder 50. One end of cylinder 50 is pivotably connected to arm 34.

A crank 52 is connected to arm 34 and rotatable about the longitudinal axis of pin 36. One end of crank 52 is pivotably connected to one end of a piston rod 54 by means of a clevis. Piston rod 54 extends into cylinder 56 wherein it terminates at a piston.

A rocker arm unit 57 is supported by the container 22 and movable between the solid line and phantom positions in the direction of the double-headed arrow in FIGURE 3. Unit 57 is movable with the container when the container moves toward and away from the die 24. Unit 57 includes a rocker arm 58 keyed to a shaft 62. A crank 64 is also keyed to shaft 62. Crank 64 is supported between bearings 66 and 68 for the shaft 62. One end of crank 64 is pivotably connected to a clevis at one end of a piston rod 70. The piston rod 70 extends into cylinder 72. The brackets 60 on the container 22 facilitate the support of the elements comprising the rocker arm unit 57.

Figure 2:
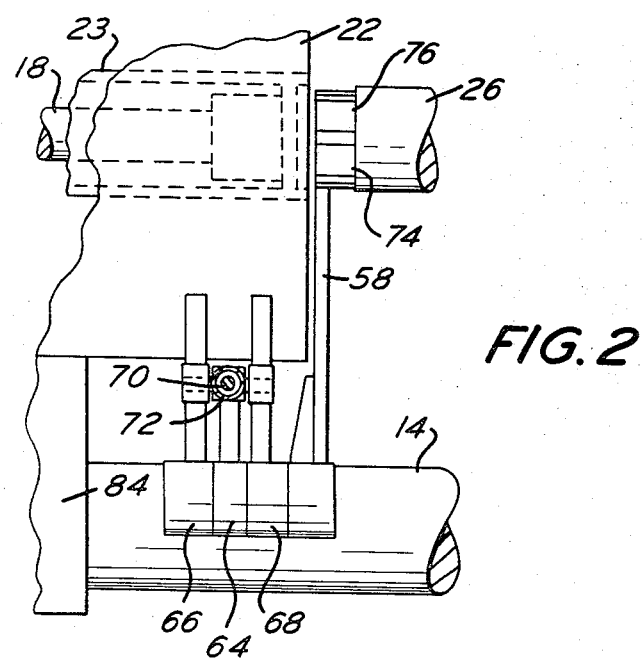
FIGURE 2 is a partial top plan view of the apparatus shown in FIGURE 1 and taken along the lines 2—2.

As shown more clearly in FIGURE 2, the arm 58 is positioned adjacent the front face of the container 22 and terminates in adjustable surfaces 74 and 76 which support a portion of the billet 26 as will be made clear hereinafter. Surfaces 74 and 76 may be adjusted in the manner described above, namely by adding or removing pads of different thicknesses. A rocker arm unit 78 is supported by the housing for die 24. Unit 78 is similar to unit 57 and includes a rocker arm 80 terminating in support surfaces 82. Accordingly, it is not deemed necessary to describe unit 78 in greater detail.

The container 22 and its rocker arm unit 57 is mounted for movement along the base frame 13. A piston cylinder arrangement, not shown, is connected to the container 22 for selectively causing the same to move toward and away from the die 24. Limit switches 88 and 90 are adjustably supported by the frame 13 in a position so that they may be contacted by a trip member 92. Trip member 92 depends from the container 22. It is desirable to adjustably position the switches 88 and 90 so as to take into consideration billets of different lengths.

The sequence of steps in the operation of the extrusion is diagrammatically illustrated in FIGURES 4-7.

A billet 26 is delivered in timed intervals to the rocker arm unit 28 as described in Patent 2,985,320 or manually, if desired. Unit 28 would be the only unit supporting the billet 26 when the billet 26 is short. If the length of billet 26 is substantially longer than unit 28, either or both of the units 30 and 32 may also be simultaneously actuated. The rocker arm units support the billet 26 in a position aligned with the container 22 and die 24.

Figure 4:
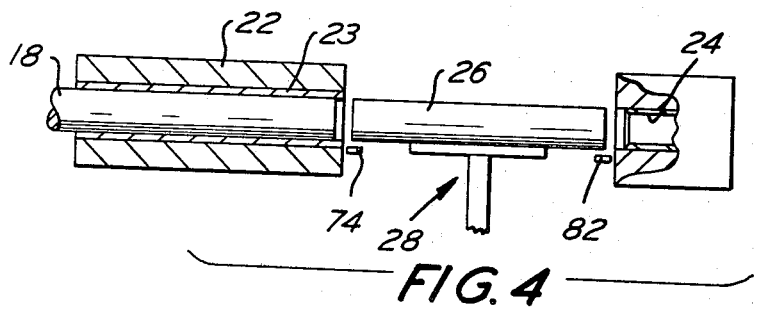
FIGURES 4–7 are diagrammatic illustrations of the sequence involved in extruding a billet.
Figure 5:
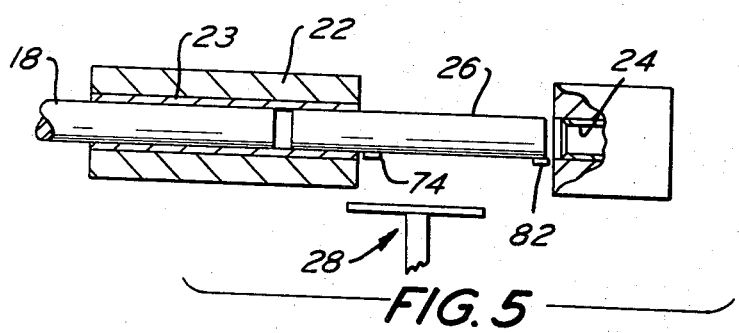
Figure 6:
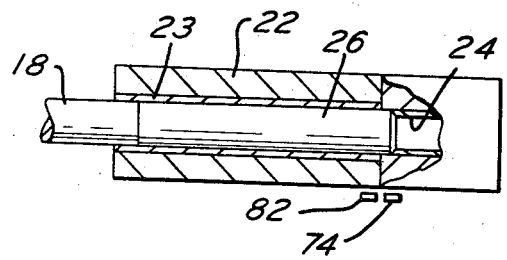

When the rocker arm unit or units move the billet 26 to the loading position illustrated in FIGURE 4, the container 22 has been moved to the position illustrated wherein it is telescoped over the stem 18. As soon as the rocker arm unit or units position the billet 26 aligned with container 22 and die 24, arms 58 and 80 move in and support the ends of the billet. Thereafter, the rocker arm unit descends and the container 22 moves relative to the stem 18 and toward the die 24 with the billet 26 supported at its ends by the surfaces 74 and 82 of the rocker arms 58 and 80. When about two inches of the billet has entered the container, switch 88 will be tripped and the arm 58 will rotate to the phantom position illustrated in FIGURE 3. As the container 22 continues to move toward the die 24, the stem remains stationary and the billet 26 enters the container 22. When about one-half the billet 26 has entered the container 22, member 92 will trip switch 90 and cause the arm 80 to move to an inactive position. The inactive position of unit 57 is shown in phantom in FIGURE 3 and diagrammatically illustrated in FIGURE 6.

As will be apparent from FIGURE 3, arm 58 need only move through a small arc in order not to interfere with movement of the container 22 or the loading of the billet as compared with the rocker arm units 28-32. This results from the fact that arm 58 is supported by the container and does not include jaws for embracing the billet. Hence, units 28-32 can immediately descend after the billet is supported by arms 58 and 80, thereby increasing the speed and simplicity with which the billet can be loaded into the container.

Figure 7:
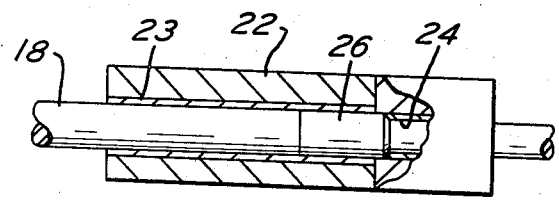

When the container 22 engages the front face of the housing for the die 24, it will stop. Thereafter, the piston cylinder means associated with the stem 18 will cause the stem 18 to move through the container 22 and push the billet 26 through the die 24, thereby extruding an extruded product 94 as illustrated in FIGURE 7. As will be apparent from FIGURES 4-7, the length of the stroke for stem 18 is only approximately fifty to sixty percent of the combined length of the container 22 and billet 26. Normally in conventional direct extrusion processes, the length of travel of the stem 18 is greater than the combined length of the billet and the container.

It is possible to eliminate the necessity for the rocker arm unit 74 or 82 if desired. This may be accomplished by initially supporting the billet 26 in a loading position by means of rocker arm units 28 and 32. As the container 22 moves toward the die 24, the rocker arm units 28 and 32 will be sequentially deactivated to the phantom position illustrated in FIGURE 3.

The present invention does not interfere with the ability to utilize conventional heated billets. The savings effected by the substantial reduction in the length of the stroke of the stem 18, the length of the piston cylinder arrangement for effecting movement of the same, as well as floor space for the apparatus, the decrease in the amount of hydraulic oil required, etc., greatly exceeds the cost of the elements necessary to effect a reciprocation of the container 22 so that it may move from the positions illustrated diagrammatically in FIGURES 4 and 6. Depending on the size of the press involved, the saving in length may be up to five or six feet.

The present invention may be embodied in other specific forms without departing from the spirit or essential attributes thereof and, accordingly, reference should be made to the appended claims, rather than to the foregoing specification as indicating the scope of the invention.

It is claimed:

1. In an extrusion press comprising a pressing stem, a die aligned with the stem, a container aligned with and disposed between the stem and die, said container being supported for movement between an extrusion position and a loading position, said container in its extrusion position being juxtaposed to said die, said container in its loading position being telescoped over said stem, loading means for selectively positioning a billet between and aligned with the die and the container when the container is in its loading position, supporting means separate from said loading means for supporting the billet by contact with the billet at a location between the ends thereof while the container is moving towards its extrusion position, at least a portion of said supporting means being movable in a direction parallel to said stem while in contact with the billet, and means for moving the stem relative to the container when the container is in its extrusion position for extruding the billet in the container through the die.

2. In a press in accordance with claim 1 wherein said loading means includes a rocker arm unit mounted for pivotable movement about an axis substantially parallel to the longitudinal axis of a container, said unit being movable to a position wherein it may receive a billet to be extruded, and said supporting means being spaced from said unit for contact with a billet while the billet is supported by the unit.

3. In a press in accordance with claim 1 wherein said supporting means includes a pivotable rocker arm unit on said container for movement with said container, said unit including a movable arm coupled to a cylinder for effecting movement of the arm to a position so that the arm will support an end portion of the billet.

4. In a press in accordance with claim 1 wherein said supporting means includes a rocker arm unit supported by a housing for the die, said unit including an arm pivotably mounted for movement to a position so that it can support an end portion of the billet.

5. In an extrusion press comprising a die, a container movable toward and away from said die, supporting means movable to a position for supporting a billet disposed between the die and container so that the billet will enter the container as the container moves toward the die, said means being movable substantially parallel to the longitudinal axis of said die and container, said means including a supporting arm mounted on said container and movable to a position for engaging and supporting only an end portion of the billet, a pressing stem, said container being telescoped over at least a portion of said stem in one position of said container.

6. In a press in accordance with claim 5 including loading means having a movable arm supported by structure which is stationary with respect to the container, said loading means being adapted to position a billet between and aligned with the container and the die, the supporting surface of said loading means being longer in a direction parallel to the axis of said container than the corresponding length of the supporting surface of said supporting arm.

7. In a method of extruding a billet through a die comprising the steps of positioning a billet between and aligned with a die and a container by a first means, transferring the support of the billet while it is in its aligned position to a second means, moving the container and at least a portion of said second means toward the die and simultaneously causing the billet to enter the container while it is at least partially supported by the second means, terminating support of the billet by the second means during movement of the container toward the die, and extruding the billet through the die.

8. In a method in accordance with claim 7 including the step of telescoping the container over a pressing stem before said positioning step, and causing the extent to which the stem enters the container to decrease as the billet enters the container, and then causing the stem to move through the container to effect such extruding of the billet through the die.

9. A method in accordance with claim 7 wherein said transferring step includes moving an arm on said container and an arm supported adjacent said die into a position wherein the arms constitute the second means and support the billet.

10. In a press in accordance with claim 1 wherein said loading means includes at least two separate units selectively operable depending on the length of the billet, said units being disposed side-by-side and having support surfaces which are aligned.

References Cited

UNITED STATES PATENTS

| 2,142,704 | 1/1939 | Sparks | 72—272 |
| 2,429,525 | 10/1947 | Rawlinson | 72—270 |
| 2,976,991 | 3/1961 | De Matto | 72—270 |
| 2,985,320 | 5/1961 | Kent | 214—1 |

FOREIGN PATENTS 1,156,374  10/1963  Germany.

CHARLES W. LANHAM, *Primary Examiner.*

K. C. DECKER, *Assistant Examiner.*

U.S. Cl. X.R.

72—272; 214—1